United States Patent [19]
Finnan

[11] Patent Number: 5,120,761
[45] Date of Patent: Jun. 9, 1992

[54] METHOD OF MAKING A FREE-FLOWING SPRAY DRIED EDIBLE POWDER COMPRISING AN OIL

[76] Inventor: Jeffrey L. Finnan, 13689 Phelps, Southgate, Mich. 48195

[21] Appl. No.: 680,773

[22] Filed: Apr. 1, 1991

Related U.S. Application Data

[63] Continuation of Ser. No. 539,271, Jun. 19, 1990, abandoned, which is a continuation of Ser. No. 258,171, Oct. 14, 1988, abandoned.

[51] Int. Cl.$^5$ ................ A61K 31/355; A61K 9/50
[52] U.S. Cl. ................ 514/458; 514/951; 514/960; 424/499
[58] Field of Search ......... 514/458, 774, 951, 471, 514/960; 424/499

[56] References Cited

U.S. PATENT DOCUMENTS

| | | | |
|---|---|---|---|
| 2,824,807 | 2/1958 | Laster et al. | 426/471 |
| 2,980,587 | 4/1961 | Ham et al. | 514/458 |
| 3,067,105 | 12/1962 | Ratish et al. | 514/458 |
| 3,124,510 | 3/1964 | Rosenberg | 514/458 |
| 3,137,630 | 6/1964 | Hecker et al. | 426/471 |
| 3,138,532 | 6/1964 | Aiello et al. | 514/458 |
| 3,184,385 | 5/1965 | Anderson | 514/458 |
| 3,186,909 | 6/1965 | McMurty et al. | 426/471 |
| 3,207,666 | 9/1965 | Houtgraaf et al. | 426/471 |
| 3,558,323 | 1/1971 | Cannalonga et al. | 514/474 |
| 3,608,083 | 9/1971 | Bunnell et al. | 514/458 |
| 3,749,799 | 7/1973 | Cort et al. | 426/471 |
| 3,869,539 | 3/1975 | Kring et al. | 514/458 |
| 3,899,598 | 8/1975 | Fischer et al. | 426/73 |
| 3,904,771 | 9/1975 | Donnelly et al. | 426/471 |
| 3,914,430 | 10/1975 | Cannalonga et al. | 426/471 |
| 3,947,596 | 3/1976 | Cannalonga et al. | 514/458 |
| 3,962,384 | 6/1976 | Cannalonga et al. | 514/458 |
| 4,001,438 | 1/1977 | Marmo et al. | 426/96 |
| 4,107,334 | 8/1978 | Jolly | 426/7 |
| 4,395,422 | 7/1983 | Schmidt et al. | 514/458 |
| 4,519,961 | 5/1985 | Schumacher et al. | 514/725 |
| 4,711,894 | 12/1987 | Wenzel et al. | 514/458 |

*Primary Examiner*—Frederick E. Waddell
*Assistant Examiner*—Raymond J. Henley, III

[57] ABSTRACT

A free-flowing, spray-dried edible powder is preferably made by partially hydrolyzing a gelatin, followed by making an emulsion of the gelatin and an edible oil, followed by spray-drying the emulsion. The method partially hydrolyzes the gelatin so that the weight average molecular weight of the gelatin is between about 15,000 and 35,000. Preferably the vitamin is vitamin E. Preferably the partial hydrolysis of the gelatin is an enzymatic hydrolysis.

20 Claims, No Drawings

METHOD OF MAKING A FREE-FLOWING SPRAY DRIED EDIBLE POWDER COMPRISING AN OIL

This is a continuation of co-pending application Ser. No. 07/539,271 filed on Jun. 19, 1990, now abandoned which is a continuation of copending application (s) Ser. No. 0/258,171 filed on Oct. 14, 1988, now abandoned.

BACKGROUND OF THE INVENTION

The present invention is related to the spray-drying of nutritional products. More specifically, the invention pertains to the spray-drying of oil-containing nutritional products, especially oil-soluble vitamins. The present invention also pertains to spray-dried nutritional products which comprise gelatin.

The closest related art known to the Applicants is a powder which comprises Vitamin E and gelatin, this powder having been sold by Hoffmann-La Roche, Inc. This product has been sold prior to Jul. 1, 1987. Furthermore, Applicants have analyzed this product known as Vitamin E Acetate 50% SD, and have found that the weight average molecular weight of the gelatin therein is between 15,000 and 25,000, but Applicants have no knowledge of the method Hoffmann-La Roche employs in making this product.

In addition to the vitamin E product sold by Hoffmann-La Roche, a similar product has been sold by Rhone-Poulenc. The Rhone-Poulenc product is comprised of approximately 50 weight percent vitamin E and 50 weight percent gelatin. However, the Rhone-Poulenc product, if resuspended in water, forms an unstable emulsion, and the Rhone-Poulenc powder, if tabletted, forms relatively soft tablets. Furthermore, the gelatin used in the Rhone-Poulenc product has been found to have a weight average molecular weight of 5890, this molecular weight being far below Applicant's claimed molecular weight range.

Also related to the present invention are three U.S. Patents assigned to Hoffmann-La Roche patents being U.S. Pat. Nos. 3,608,083; 3,914,430; and 3,962,384. Each of these patents is discussed briefly below.

U.S. Pat. No. 3,608,083 pertains to a vitamin E powder which comprises a hydrolyzed gelatin. The hydrolyzed gelatin has a "very low Bloom" and "a molecular weight of about 9,000 to about 11,000". The '083 patent fails to state the method by which the 9,000–11,000 gelatin molecular weight was determined. Furthermore, the '083 patent states that very low Bloom hydrolyzed gelatins are advantageous for use in the powder because of their relative heat stability without off-odors developing, while other hydrolyzed gelatins develop unpleasant off-odors when used in granulation and tableting. The '083 patent also states that low Bloom hydrolyzed gelatins are preferable because they impart good tableting characteristics to the composition which comprises these gelatins. The hydrolyzed gelatins of the '083 patent are disclosed as being produced by a controlled hydrolysis of gelatin. In contrast to the '083 patent, the process of the present invention utilizes a partially hydrolyzed gelatin having a weight average molecular weight of about 15,000 to about 35,000 as determined by gel permeation chromatography.

U.S. Pat. No. 3,914,430 and U.S. Pat. No. 3,962,384 are based on a divisional application and a continuation application, respectively, of an abandoned parent application. While the specifications of the '430 and '384 patents are identical, the '430 patent is directed at a vitamin E powder while the '384 patent is directed at a method of making that powder. Both patents disclose the combination of a hydrolyzed gelatin in combination with a vitamin E oil, the gelatin and oil being spray dried along with other minor excipients. The gelatin described in both '430 and '384 patent is a hydrolyzed gelatin with either 0-Bloom or "low Bloom", the gelatin having a molecular weight of from about 9,000 to 11,000. As with the '083 patent, neither the '430 nor the '384 patents describes how the molecular weight was determined. The examples in these patents describe spray drying both vitamin E and vitamin A as well as a flavor oil, each of these oils being in admixture with a 0 Bloom gelatin during the spray-drying process. Both of these patents describe the gelatin as a hydrolyzed gelatin having a 0 Bloom and a molecular weight range of from 9,000 to 11,000, and both state that the invention is in no way limited to the use of any particular hydrolyzed gelatin.

In contrast to all of the Hoffmann-La Roche patents, the process of the present invention utilizes gelatin having a weight average molecular weight of between about 15,000 and 35,000, as determined by gel permeation chromatography.

The present invention is concerned with the spray drying of an emulsion which comprises an edible oil and gelatin. It has been unexpectedly found that the molecular weight of gelatin is critical to the process of spray drying an emulsion or solution comprising gelatin. If the molecular weight of the gelatin is too high, the gelatin will form a film leading to a skin which prevents the formation of droplets in a normal spray-dry process. The result of this is that the majority of the material exiting the spray-drying nozzle will become plastered on the walls of the spray dryer. The remaining small portion of the material which does not adhere to the walls of the spray dryer is a non-free-flowing, non-particulate, fluffy powder. On the other hand, if the molecular weight of the gelatin is too low, a stable emulsion of the partially hydrolyzed gelatin and edible oil cannot be formed. Furthermore, if the molecular weight of the gelatin is too low, off-odors develop due to the presence of significant amounts of low molecular weight gelatin hydrolysis products. Amine-type off odors are a result of this low molecular weight material. Thus, it has been found that gelatin within a specific molecular weight range is especially suited to making free-flowing edible powders via spray drying without developing any of the problems described above.

U.S. Pat. No. 2,824,207, to Laster, describes a method of spray drying gelatin-containing formulations by having a cooling zone immediately below the spray nozzle. The '207 patent states that the cooling zone is needed in order to permit the formation of droplets. The '207 patent is an alternative to the method of the present invention, and the '207 patent acknowledges the problems (in spray drying gelatin formulations) discussed above. The Applicant of the present invention has discovered a completely different method of avoiding the problems described in the '207 patent.

BRIEF DESCRIPTION OF THE INVENTION

The present invention pertains to a method for making a free-flowing edible powder. The method comprises the steps of:

A. partially hydrolyzing a gelatin under conditions so that the resulting partially hydrolyzed gelatin has a weight average molecular weight (WAMW) between about 15,000 and about 35,000, as determined by gel permeation chromatography;

B. making a substantially complete and substantially stable emulsion of the partially hydrolyzed gelatin and an edible oil;

C. spray drying the emulsion

In the process described above, the substantially stable emulsion of the partial hydrolyzed gelatin and edible oil may be made before the partial hydrolysis of the gelatin is performed. However, it is preferable to partially hydrolyze the gelatin. It has been found that the weight average molecular weight of the gelatin should be between about 15,000 and about 35,000 in order for the emulsion to be stable, and to ensure that the resulting product will not have off-odors, and also to ensure that the emulsion will be spray dryable, without causing significant amounts of product to adhere to the walls of the spray drying chamber while also producing a free-flowing powder.

DETAILED DESCRIPTION OF THE PREFERRED EMBODIMENTS

The method of the present invention is concerned with making a free-flowing edible powder. This edible powder may be utilized in one or more of a wide variety of end uses. For example, the free-flowing powder may be used either alone or in combination with other ingredients in a capsule product, or may be used as an additive to an animal feed product, or in foods suitable for human consumption. Furthermore, the edible powder may be used alone or in combination with other ingredients and excipients for direct compression into a tablet, especially pharmaceutical tablets.

The edible powder comprises both a partially-hydrolyzed gelatin and an edible oil. The edible oil may be any oil which has nutritional characteristics. Preferred edible oils are fat-soluble vitamins and flavor oils. The most preferred edible oil for use in the process of the present invention is vitamin E acetate (i.e. dl-alphatocopheryl acetate). It is preferred that the fat-soluble vitamin is present in an amount of about 50 percent, by weight, and that the gelatin is present in an amount of about 50 percent, by weight.

The method of the present invention utilizes the step of partially hydrolyzing a gelatin. Gelatin is most typically characterized by its "Bloom strength". Bloom strength is an arbitrary scale for rating the strength of gelatin gels. The maximum Bloom for gelatin is around 300. Three hundred Bloom gelatin is commercially available. Also available is "0 Bloom" gelatin, which is also known as "hydrolyzed" gelatin. Gelatins having the Bloom values between 300 and 0 are also commercially available, e.g 85 Bloom gelatin is currently offered by several manufacturers. Furthermore, it is widely recognized that any degree of gelatin hydrolysis (i.e. any desired Bloom count) may be obtained by one or more of a variety of gelatin hydrolysis processes.

Gelatins are, in general, hydrolyzed by three different kinds of reagents: acids, bases, and enzymes. Although acids, bases, and enzymes each produce somewhat different hydrolyzed gelatins, it is possible to produce a gelatin of any desired Bloom via either acid or base or enzyme hydrolysis. Gelatins produced by acid processing are generally referred to as Type A gelatins, while the gelatin produced by base processing are referred to as Type B gelatins. Gelatin production is carried out by the hydrolysis of collagen. Type B gelatins are produced by subjecting, for example, bone, to the action of a strong base, followed by rinsing the base off, followed by "cooking" the treated bone in boiling water to extract gelatin. Type B gelatin is a preferred starting material in the process of the present invention.

Gelatin is a mixture of proteins obtained by hydrolysis of collagen by boiling skin, ligaments, tendons, etc. As a result, the individual protein molecules which make up gelatin have a significant amount of variety. Furthermore, the acid, base, or enzyme hydrolyzing reagents may attack the protein molecules at varying points along their length. As a result, it is not surprising that gelatin (both hydrolyzed and unhydrolyzed) comprises molecules of widely varying molecular weight. As a result, no gelatin has a single molecular weight which characterizes the hydrolysis product. Rather, molecular weight averages must be used to characterize hydrolyzed gelatins. Two averages which can be used to characterize hydrolyzed gelatin are the "weight average molecular weight" (WAMW) and "number average molecular weight" (NAMW). The number average molecular weight and the weight average molecular weight of a gelatin may be calculated by subjecting the gelatin to gel permeation chromatography followed by analyzing the results. The equations below may be used for the calculation of number average molecular weight and weight average molecular weight.

$$NAMW = \frac{\Sigma(\text{Area}_i)}{\Sigma \frac{(\text{Area}_i)}{(M_i)}}$$

$$WAMW = \frac{\Sigma[(\text{Area}_i)(M_i)]}{\Sigma(\text{Area}_i)}$$

Area$_i$ is the area of the $i^{th}$ section or slice in a GPC analysis curve. $M_i$ is the molecular weight of the $i^{th}$ slice determined from the molecular weight calibration curve. Typically an analysis curve is divided into 100 equal sections or slices.

The NAMW is effected more by changes in the low molecular weight portion of the distribution curve while the WAMW is effected more by changes in the high molecular weight portion of the distribution curve. The inventors of the process of the present invention have found that gel permeation chromatography is an extremely accurate method for characterizing the molecular weight of gelatins, in contrast to other methods described immediately below.

The molecular weight range of unhydrolyzed gelatins has, in the past, generally not been evaluated because of the esoteric nature of measuring methods such as light scattering and centrifugal sedimentation, and because of the lack of chromatographic procedures. Hydrolyzed gelatins, however, have been evaluated by the Formal Titration Method. This latter method is based on the reaction of formaldehyde with the amino groups in the gelatin. Per 100,000 molecular weight, on the average, gelatin contains 37 beta-amino and imidzole groups embedded within the molecule and 1 terminal alpha-amino group. This equates to 0.42 millimoles of embedded groups and 0.01 millimoles of terminal groups which are titratable per gram of gelatin of 100,000 molecular weight. Thus, as molecular weight decreases, the number of terminal groups increases relative to the number of embedded groups. As molecular weight increases, however, it becomes increasingly difficult to measure the difference in titration afforded by the terminal group. Hence, the formal titration method for gelatin molecular weight determination becomes inaccurate and cannot be used with accuracy or precision at above 10,000 molecular weight.

The method of the present invention comprises the step of partially hydrolyzing the gelatin so that the resulting partially hydrolyzed gelatin has a weight average molecular weight (WAMW) between about 15,000 and about 35,000 as determined by gel permeation chromatography (GPC). A procedure for gel permeation chromatography analysis is described immediately below.

GEL PERMEATION CHROMATOGRAPHY (GPC)

Samples of gelatin for chromatography were prepared by dissolving in 0.1M sodium phosphate buffer at pH 7.0 to a level of 0.1 to 1 weight percent. 40 Microliters of the gelatin solutions were chromatographed on WATERS ULTRAHYDROGEL TM 1000, 500, and 250 columns which were connected in decreasing order. Waters is a Division of Millipore Corporation, 34 Maple Street, Milford, Mass. 01757. The solvent was the same as the dissolving buffer and the flow rate was 1.0 ml/min. The run time for each sample was 40 minutes. Detection was made at 230 nm or by refractive index. The molecular weight calibration curve for the above chromatography system was determined using 15 polysaccharide standards of known molecular weights: 180, 342, 505, 667, 829, 991, 1153, 5800, 13300, 23700, 48000, 100000, 186000, 380000, and 853000. The correlation coefficient was 0.99954 for a third-order-fit equation. With the calibration curve molecular weight calculations were performed with WATERS EXPERT TM Chromatography Software version 6.0 using 100 slices. The baseline and integration start and stop times were manually set.

As stated above, the method of the present invention involves partially hydrolyzing a gelatin. The partial hydrolysis may be carried out by either acid hydrolysis, base hydrolysis, or enzyme hydrolysis. The hydrolysis is "partial" because the hydrolysis is terminated before the gelatin is completely hydrolyzed. Enzymatic hydrolysis is preferred over either acid hydrolysis or base hydrolysis in the process of the present invention. The enzyme to be used in the process of the present invention must be a proteolytic enzyme. Furthermore, it is preferred that the proteolytic enzyme is an endopeptidase. It is also preferred that the proteolytic enzyme used is a member selected from the group consisting of proteases from B. subtilisn strains and neutral fungal proteases from Aspergillis cultures. It is most preferred that the enzyme is subtilis. When employing enzymatic hydrolysis, the hydrolysis is controlled by any one or more of several methods of deactivating the enzyme. Specific methods for enzyme deactivation comprise:

(1) addition of acid to lower the pH enough to render the enzyme inactive;
(2) the addition of an effective chelating agent in an amount sufficient to deactivate the enzyme;
(3) heating the enzyme enough to cause deactivation;
(4) carrying out the partial hydrolysis at a substantially constant temperature whereby the enzyme is deactivated, by the effect of the temperature, by the time the enzyme produces a desired degree of partial hydrolysis of the gelatin.

In the process of the present invention, the latter method is the most preferred method for deactivating the enzyme. If this method is employed (i.e. method "4" above), it is preferred that the temperature is about 70° C. during the hydrolysis step.

Another step in the process of the present invention comprises making a substantially complete and substantially stable emulsion of the partially hydrolyzed gelatin emulsion and and edible oil. In the process of the present invention, it is necessary that a substantially complete and substantially stable emulsion is formed. The phrase "substantially complete" emulsion refers to an emulsion having substantially 100 percent of the oil in the emulsified (i.e. droplet) form. The phrase "substantially stable" emulsion refers to an emulsion which will not de-emulsify (to any substantial degree) upon standing for a period of several hours.

Although it is possible to make an emulsion of a gelatin and an edible oil, following which the gelatin is partially hydrolyzed, it is preferred to partially hydrolyze the gelatin before making the emulsion of gelatin and edible oil. The emulsion is comprised of oil droplets within an aqueous gelatin solution. Although the mechanism of emulsion stabilization is not completely certain, presumably the gelatin binds to the surface of the emulsifying oil droplets and thereby prevents de-emulsification. It is believed that having a weight average molecular weight of 15,000 or above results in enough gelatin binding to the surface of the emulsified oil droplets to enable the formation of a substantially complete and substantially stable emulsions. In contrast, it appears that if the gelatin has a weight average molecular weight of significantly less than 15,000 not enough gelatin binds to the surface of the emulsified oil droplets.

Once a stable emulsion of a partially hydrolyzed gelatin and the edible oil is made, the emulsion is then spray dried, whereby the product is a free-flowing edible powder. As used herein, the term spray drying refers to the emulsion from the fluid state into a dried particulate form by spraying the emulsion into a hot drying medium. The resulting product is, in general and most preferably, a powder, but the powder may, under certain condition, exhibit a relatively small degree of granulation and/or agglomeration.

The method of the present invention preferably further comprises the addition of a stabilizer to the powder. The term "stabilizer," as used herein, refers to a compound which inhibits microbial growth in the emulsion. The stabilizer may be selected from the group consisting of sodium benzoate, potassium sorbate, esters of p-hydroxybenzoic acid, and propionic acid. The stabilizer is preferably present in an amount between 0.1 percent, by weight, and 0.5 percent, by weight.

The method of the present invention also employs the use of silica in the process of producing the powder. The silica is preferably introduced into the spray chamber via a separate nozzle. The silica coats the droplets and keeps them from adhering to the walls of the chamber as well as keeping the droplets from adhering to one another. Preferably, the silica is present in the powder in an amount between about 0.5 percent by weight and about 2 percent by weight. Most preferably the silica is present in an amount of about 1 percent by weight. The most preferred silica for use in the process is Aerosil ®200. The properties of Aerosil ®200 are as follows:

| | |
|---|---|
| BET Surface Area (m$^2$/gm): | 200 + 25 |
| Average Primary Particle Size (nm) | 12 |
| Tap Density (gm/l) | ca 50 |

-continued

| | |
|---|---|
| Moisture Content (2 hrs at 105° C.) | 1.5 maximum |
| Ignition Loss* (2 hrs at 1000° C.) | 1% maximum |
| pH (4% aqueous dispersion) | 3.6–4.3 |
| $SiO_2$* | 99.8% |
| $Al_2O_3$ | 0.05% maximum |
| $Fe_2O_3$ | 0.003% maximum |
| $TiO_2$ | 0.03% maximum |
| HCl | 0.025% maximum |

*Based on material dried for 2 hours at 105° C.

It has been found that is is advantageous to have a small proportion of moisture in the powder prior to tabletting, as the presence of moisture unexpectedly results in the formation of a harder tablet. The moisture content of the powder is preferably between about 0.5 percent by weight and about 4 percent by weight.

The following examples serve to illustrate the present invention. Examples 1 and 2 illustrate partial gelatin hydrolysis with acid and base, respectively. Examples 3 and 4 illustrate partial gelatin hydrolysis via enzyme. Examples 1-4 are limited to a single step of the invention, i.e. the gelatin hydrolysis. Example 5, a comparative example, demonstrates the difficulty encountered in spray drying an 85 Bloom gelatin. Example 6 illustrates the entire process, i.e. both the partial hydrolysis, the emulsion production, and the spray-drying process, in accord with the process of the present invention. Examples 7-17 indicate the degree of reproducibility of the enzyme-hydrolysis process. Examples 18-20 demonstrate that any one of a variety of enzymes may be utilized in the process. Example 21 is a comparative example which demonstrates the fact that a substantially complete, substantially stable emulsion cannot be made with gelatin having a WAMW of about 10,000.

EXAMPLE 1

Gelatin Hydrolysis by Acid

To 100 grams of water, 100 grams of 85-Bloom (Type B) gelatin were added and dissolved as the temperature was raised to 80° C. in a jacketed beaker. The temperature rose up to 85° C. when 10 grams of concentrated sulfuric acid were added but the temperature gradually dropped back to 80° C. Samples were taken at 0, 5, 10, and 30 minutes into the hydrolysis reaction. The samples (1 gram) were diluted in 49 grams of 0.1M pH phosphate buffer. This procedure quenched the hydrolysis reaction. The samples were analyzed for molecular weight. Table I provides the results of these analyses.

TABLE I

| Molecular Weight Averages of 85-Bloom Gelatin Hydrolyzed with Sulfuric Acid | | |
|---|---|---|
| Time (minutes) | NAMW | WAMW |
| 0 | 5770 | 51500 |
| 5 | 4730 | 31300 |
| 10 | 4400 | 25400 |
| 30 | 3649 | 15600 |

EXAMPLE 2

Gelatin Hydrolysis by Base

In 90 grams of water 100 grams of 85-Bloom (Type B) gelatin were added and dissolved as the temperature was raised to 60° C. in a jacketed beaker. Then 10.4 grams of 50% aqueous sodium hydroxide were added. Samples were analyzed for molecular weight as in Example 1. Table II provides the results of the basic partial hydrolysis.

TABLE II

| Molecular Weight Averages of 85-Bloom Gelatin Hydrolyzed with Sodium Hydroxide | | |
|---|---|---|
| Time (minutes) | NAMW | WAMW |
| 0 | 5990 | 69500 |
| 5 | 4640 | 28100 |
| 10 | 4030 | 21200 |
| 30 | 1980 | 13000 |

EXAMPLE 3

Enzymatic Gelatin Hydrolysis 85-Bloom Gelatin

To 201 grams of water 99 grams of 85-Bloom (Type B) gelatin were added as water was being heated to 70° C. in a jacketed beaker. At this point 3.2 grams of this solution were diluted into 96.8 grams of 0.1M pH 7.0 buffer which was at least 90° C. and kept hot for 15 minutes. This procedure was used to prepare the gelatin for GPC analysis and quench the enzyme (if present) hydrolysis by temperature denaturation and dilution. 0.062 Grams of Miles Laboratories' HT-Proteolytic 200, dissolved in 10 grams of water, were added, and additional aliquots of 3.2 grams were taken at 5, 10, 20, 30, and 60 minutes after enzyme addition and quenched similarly as described above. GPC analysis was performed as described above. Table III provides the results of the GPC analysis as performed on the above aliquots.

TABLE III

| Hydrolysis of 85-Bloom Gelatin By .062% of HT-Proteolytic 200 at 70° C. | | |
|---|---|---|
| Time (minutes) | NAMW | WAMW |
| 0 | 5120 | 51700 |
| 5 | 4350 | 32100 |
| 10 | 4120 | 29100 |
| 20 | 4103 | 27200 |
| 30 | 4000 | 26000 |
| 60 | 3900 | 25000 |

EXAMPLE 4

Enzymatic Gelatin Hydrolysis: 200-Bloom Gelatin

To 183 grams of water 100 grams of 200-Bloom (Type B) gelatin were added as the water was being heated to 70° C. in a jacketed beaker. At this point 3.2 grams of this solution were diluted as described in example 1 for a zero time point molecular weight determination. 0.2 Grams of Miles Laboratories' HT-Proteolytic 200, dissolved in 23 grams of water, were added, and additional aliquots of 3.2 grams were taken at 5, 10, 20, 30, and 60 minutes after enzyme addition and quenched similarily as described above. GPC analysis was performed as in Example 3. Table IV provides the results of the GPC analysis as performed on these aliquots.

TABLE IV

| Hydrolysis of 200-Bloom Gelatin By 0.2% of HT-Proteolytic 200 at 70° C. | | |
|---|---|---|
| Time (minutes) | NAMW | WAMW |
| 0 | 9420 | 195000 |
| 5 | 5540 | 28300 |
| 10 | 5510 | 27600 |

TABLE IV-continued

| Hydrolysis of 200-Bloom Gelatin By 0.2% of HT-Proteolytic 200 at 70° C. | | |
|---|---|---|
| Time (minutes) | NAMW | WAMW |
| 20 | 5310 | 26000 |
| 30 | 5060 | 24300 |
| 60 | 4345 | 18649 |

EXAMPLE 5

Comparative Example: Spray-drying 85-Bloom Gelatin

360 Pounds of 85-Bloom (Type B) gelatin, containing 10% moisture were dissolved in 624 pounds of water at 60° C. Then, 388 pounds of vitamin E acetate were homogenized into the gelatin solution. The viscosity after homogenization was 650 cps at 59° C. The emulsion was spray dried with an inlet air temperature of 175° C. and an outlet of 99° C. Silica was charged to the top of the tower at a rate of approximately 0.08 pounds per minute. After 95 minutes and approximately 712 pounds of the emulsion had been sprayed, the spray drying was stopped because not much product was being collected. There was also heavy build-up of emulsion on spray nozzle. This indicated that emulsion was accumulating on the spray-tower walls. Opening the tower revealed areas of one-half to two-inch accumulations which had to be scraped off. The spray drying was recommenced and finished after an additional 110 minutes. Only 230 moisture-corrected pounds were collected for a moisture-corrected yield of 33%. Table V provides an analysis of the 85-Bloom gelatin (supra) upon gel permeation chromatography analysis.

EXAMPLE 6

Spray-Drying Enzyme-Hydrolyzed 85-Bloom Gelatin

Three pounds of sodium benzoate and 1.5 pounds of potassium sorbate were added to 750 pounds of water at 60° C. Since gelatin hydrolysate solutions can support microbial growth, the benzoate and sorbate are added to inhibit any growth during emulsion preparation and holding during spray drying. Then, 369 pounds of 85-Bloom (Type B) gelatin were dissolved in the water. After raising the temperature to 66° C., 0.231 pounds of Miles Laboratories HT Proteolytic-200 dissolved in about 2 pounds of water at room temperature were charged to the gelatin solution. Twenty minutes later, 388 pounds of vitamin E acetate (97% assay, 80° C.) were added and homogenized thereinto. Upon completion of the oil addition 31 minutes later, the temperature was 73° C. and the viscosity was 375 cps. Before reaching the atomizer the emulsion was passed through a heat exchanger which raised the temperature of the emulsion to approximately 90° C. While this procedure was mainly to pasteurize the emulsion, it also ensured that the enzyme was completely inactivated. The emulsion was pumped through a nozzle atomizer at an approximate pressure of 2000 psi into a tower at an inlet temperature of approximately 185° C. and an outlet temperature of 99° C. for 141 minutes during which silica was charged into the top of the spray tower at a rate of approximately 0.085 pounds per minute. Collected were 693 pounds of product, which equates to a moisture-corrected yield of 97% of the product. The composition of the product was as follows:

| | % Dry Ingredients in Spray Dried Powder | |
|---|---|---|
| 1 | Vitamin E Acetate (97%) | 51.8 |
| 2 | Gelatin | 44.4 |
| 3 | Moisture | 2.0 |
| 4 | Silicon Dioxide | 1.5 |
| 5 | Sodium Benzoate | 0.2 |
| 6 | Potassium Sorbate | 0.1 |

The powder had good flow characteristics with a bulk density of approximately 50 grams/100 ml. About 75% of the powder particles were between 74 and 250 microns. This powder was then tabletted as described below. The powder resulting from the process described above was utilized as a component in a chewable tablet formulation. The tablet formulation was compressed into tablets. The formulation consisted of the following ingredients:

| | | Grams/Tablet |
|---|---|---|
| 1 | Vitamin E Powder | 0.412 |
| 2 | Cab-O-Sil ® HS-5 | 0.035 |
| 3 | Syloid ® 74 | 0.015 |
| 4 | Tabletting Sugar | 0.295 |
| 5 | Flavor | 0.005 |
| 6 | Magnesium Stearate N.F. | 0.002 |

The desired tablet weight of 0.76 grams per tablet was achieved. The tablets had a good friability rating (0.02%) as well as an acceptable tablet hardness (12-16 SCU). [The tablets were tested for hardness on a Schleuniger —2E hardness tester. A tablet hardness of 7-20 SCU (Strong Cobb Units) is considered acceptable in this formulation.] While the above tabletting formulation would be typical of a high-vitamin E chewable tablet and will give some indication of the tabletting characteristics of the powder, a more stringent tabletting formulation (in that it relies entirely on the vitamin E powder for binding the tablet together) is given below:

| | | Grams/Tablet |
|---|---|---|
| 1 | Vitamin E Powder | 0.4000 |
| 2 | Syloid ® 244FP | 0.0150 |
| 3 | Cab-O-Sil ® HS-5 | 0.0100 |
| 4 | Microcel C | 0.0082 |

This tabletting formulation is very good at giving an indication of how well the vitamin E oil is encapsulated. If the oil is not encapsulated, tablets are prone to be spotted and the tablets will be soft. Softness is also dependent on the compressability of the excipients. The tablets derived from this example had no spots and had a hardness of 20-21 SCU. In this formulation, hardness above 15 SCU is considered excellent. It was also found that the higher the moisture of the powder the higher the hardness. The original moisture of the powder of this example was 2.00%. If the moisture was raised to 2.69% by storing in a high humidity cabinet for a short period of time, the resulting tablets in this test had a hardness of 28 SCU. The moisture must be affecting the general compressability of the gelatin. The moisture may be acting as a plasticizer.

The enzyme-modified gelatin was analyzed via GPC analysis. The results of this analysis are given in Table V, below.

EXAMPLES 7-17

Further Examples of Enzyme Hydrolyzed Gelatin

The molecular weight numbers for Examples 7-17, which were carried out in a manner similar to Example 4, are given in Table V. In these Examples, the batch sizes varied somewhat. Examples 7 and 8 used 0.050% of HT-Proteolytic 200 relative to the gelatin in the batches. The rest of the batches used 0.062 percent of HT-Proteolytic 200.

TABLE V

Molecular Weight Averages
Enzyme-Modified Gelatin in Vitamin E Powders

| Example | NAMW | WAMW |
|---|---|---|
| 5 | 5640 | 40200 |
| 6 | 4030 | 22700 |
| 7 | 4920 | 29200 |
| 8 | 5170 | 31900 |
| 9 | 4140 | 20400 |
| 10 | 4480 | 23100 |
| 11 | 4540 | 33300 |
| 12 | 4830 | 30500 |
| 13 | 3680 | 15500 |
| 14 | 3910 | 21500 |
| 15 | 4131 | 21700 |
| 16 | 3980 | 21400 |
| 17 | 4160 | 23100 |

EXAMPLES 18-20

Gelatin Hydrolysis with Various Enzymes

To 800 grams of water 369 grams of 85-Bloom gelatin were added as the water was being heated to 70° C. in a jacketed beaker. 0.1857 Grams of Rhozyme® p53 (Example 18), ®Corolase PN (Example 19), or Enzeco® Bromelain (Example 20) dissolved in 100 grams of water, were added. Samples similar to Example 3 were taken for GPC analysis. The results of the GPC analyses for Examples 18, 19, and 20 are given in Tables VI, VII, and VIII, respectively.

TABLE VI

Hydrolysis of 85-Bloom Gelatin
By 0.05% of Rhozyme ® P53 at 70° C.

| Time (minutes) | NAMW | WAMW |
|---|---|---|
| 0 | 5520 | 56400 |
| 5 | 4754 | 32400 |
| 10 | 4640 | 30000 |
| 30 | 4478 | 27700 |
| 60 | 4290 | 24634 |

TABLE VII

Hydrolysis of 85-Bloom Gelatin
By 0.05% of ®Corolase PN at 70° C.

| Time (minutes) | NAMW | WAMW |
|---|---|---|
| 0 | 5280 | 50900 |
| 5 | 3910 | 24938 |
| 10 | 3680 | 22200 |
| 20 | 3510 | 20600 |
| 30 | 3460 | 20300 |
| 60 | 3390 | 19391 |

TABLE VIII

Hydrolysis of 85-Bloom Gelatin
By 0.05% of Enzeco ® Bromelain at 70° C.

| Time (minutes) | NAMW | WAMW |
|---|---|---|
| 0 | 5940 | 61200 |
| 5 | 4350 | 25400 |
| 10 | 3900 | 20200 |
| 20 | 3360 | 15200 |
| 30 | 3080 | 13200 |
| 60 | 2670 | 10600 |

EXAMPLE 21

Comparative Example Using a 10,000 Molecular Weight Gelatin

To a solution of 974.5 grams of 80-Bloom gelatin (Type B) in 667.4 g of water at 70 C, Miles Laboratories HT Proteolytic-200 (0.062 weight percent relative to the gelatin) was added. After one hour at this temperature, a sample was analyzed by GPC to reveal that the weight average molecular weight was 10,292. To this concentrated solution of partially hydrolyzed gelatin, 1332.6 grams of water at 60° C. were added. Then 1000 grams of vitamin E acetate were homogenized in. While some of the vitamin E was emulsified, a significant portion of the oil could not be completely homogenized such that a layer of oil formed on the top. This emulsion was considered inadequate for spray drying, as there was not substantially complete emulsification of the vitamin E oil.

The embodiments of the invention in which an exclusive privilege or property is claimed are defined as follows:

1. A method for making a free-flowing, spray-dried powder comprising the steps of:
    A) partially hydrolyzing an effective amount of a gelatin under conditions so that the resulting partially hydrolyzed gelatin has a weight average molecular weight between about 15,000 and about 35,000, as determined by gel permeation chromatography; and
    B) making a substantially complete and substantially stable aqueous emulsion of the partially hydrolyzed gelatin and an effective amount of an edible oil having nutritional characteristics; and
    C) spray-drying the emulsion to form a free-flowing powder.

2. The method as claimed in claim 1, wherein the weight ratio of said gelatin to said edible oil is about 1:1.

3. The method as claimed in claim 1, further comprising the step of compressing said free-flowing powder into one or more tablets such that said tablets have a hardness of greater than about 15 SCU.

4. The method as claimed in claim 3, wherein said tablets have a hardness of at least about 20 SCU.

5. The method as claimed in claim 4, wherein said tablets have a hardness of at least about 25 SCU.

6. The nutritional tablet prepared according to the method of claim 16.

7. The nutritional tablet of claim 6, wherein said edible oil is selected from the group consisting of fat-soluble vitamins and flavor oils.

8. The nutritional tablet of claim 7, wherein said fat-soluble vitamin is vitamin E acetate.

9. The nutritional tablet of claim 8, wherein the hardness of said tablet is at least 20 SCU.

10. The nutritional tablet of claim 9, wherein the hardness of said tablet is at least 25 SCU.

11. The nutritional tablet of claim 8, wherein said gelatin is Type B gelatin.

12. A method for making a free-flowing, spray-dried powder comprising the steps of:
   A) partially hydrolyzing a gelatin under conditions so that the resulting partially hydrolyzed gelatin has a weight average molecular weight between about 15,000 and about 35,000, as determined by gel permeation chromatography; and
   B) making a substantially complete and substantially stable aqueous emulsion of the partially hydrolyzed gelatin and a fit-soluble vitamin, the weight ratio of said gelatin to said fat-soluble vitamin being approximately 1:1; and
   C) spray-drying the emulsion to form a free-flowing powder.

13. The method of claim 12, further comprising the step of compressing said free-flowing powder into one or more tablets, said tablets having a hardness of greater than about 15 SCU.

14. The method of claim 13, wherein said fat-soluble vitamin is vitamin E acetate.

15. The method of claim 14, wherein said tablets have a hardness of greater than about 20 SCU.

16. The method of claim 15, wherein said tablets have a hardness of greater than about 25 SCU.

17. The nutritional tablet prepared according to the method of claim 13.

18. The nutritional tablet of claim 17, wherein said fat-soluble vitamin is vitamin E acetate.

19. The nutritional tablet of claim 18, wherein said table has a hardness of at least about 20 SCU.

20. The nutritional tablet of 19, wherein said tablet has a hardness of at least about 25 SCU.

* * * * *